United States Patent [19]

Krawczak et al.

[11] 4,398,798
[45] Aug. 16, 1983

[54] IMAGE ROTATING DIFFRACTION GRATING

[75] Inventors: John A. Krawczak, Minnetonka; Ernest J. Torok, Minneapolis, both of Minn.

[73] Assignee: Sperry Corporation, New York, N.Y.

[21] Appl. No.: 217,878

[22] Filed: Dec. 18, 1980

[51] Int. Cl.³ .......................... G02B 5/18; G02F 1/22
[52] U.S. Cl. ................................ 350/162.24; 350/375
[58] Field of Search ...................... 350/162.24, 162.12, 350/96.13, 353, 142, 375, 378, 380; 340/146.3 P, 146.3 Q; 356/71; 364/820; 365/50; 367/64

[56] References Cited
U.S. PATENT DOCUMENTS
3,752,563  8/1973  Torok et al. .......................... 350/375

Primary Examiner—Bruce Y. Arnold
Assistant Examiner—William Propp
Attorney, Agent, or Firm—Kenneth T. Grace; Marshall M. Truex

[57] ABSTRACT

Disclosed is an apparatus for and a method of establishing the domain walls within a stripe-domain supporting magnetizable film in a radially directed orientation, the separation of which is proportional to the distance from the center of the diffraction grating. The apparatus includes means for coupling to the stripe-domain supporting magnetizable film an orienting field that is directed orthogonal to the plane of the film but whose intensity from the center of the field source is inversely proportional to the distance from the center of the field source and further including means for coupling to said film an AC tickle field of significant to decreasing to zero amplitude for overcoming the hysteresis of the film.

2 Claims, 5 Drawing Figures

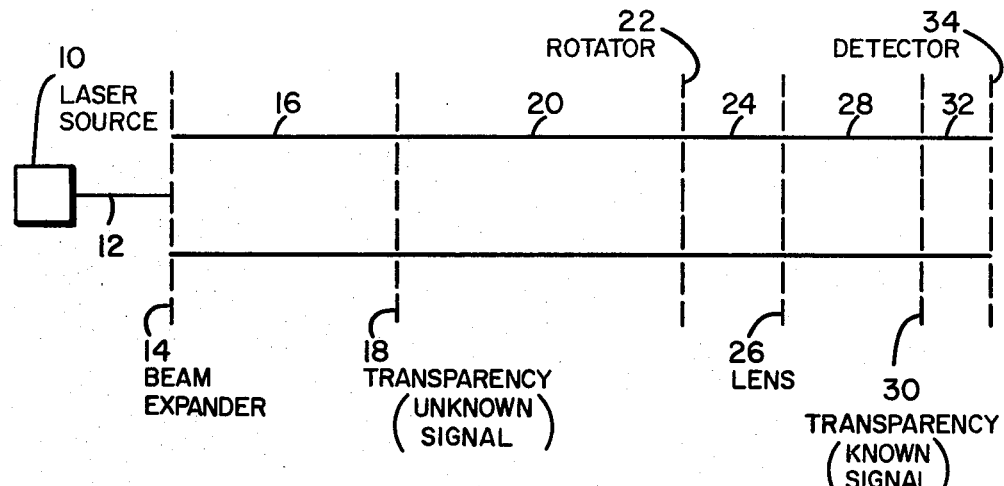
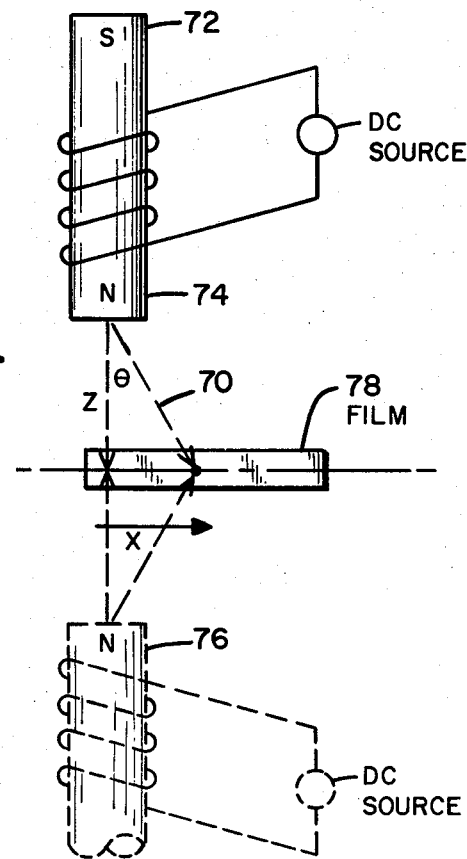

IMAGE ROTATING DIFFRACTION GRATING

BACKGROUND OF THE INVENTION

The present invention relates to optical systems and in particular to optical data processing systems that incorporate magnetizable film diffraction gratings for the control of a laser light beam to determine the correlation between known and unknown signals.

In the prior art it is known that light will be diffracted by a diffraction grating. See the text "Fundamentals of Optics," Second Edition, Jenkins and White, McGraw-Hill Book Company, 1955. More recent studies with thin-magnetizable-films having a stripe domain magnetization configuration have utilized Bitter patterns formed by colloids of magnetizable powder collected along the domain walls while variable stripe domain spacing has been achieved by strong DC fields orthogonal to the plane of the field—see the text "Ferromagnetism and Ferromagnetic Domains," Craik and Tebble, Holland Publishing Company, Amsterdam, John Wiley and Sons, Inc., Volume 4, 1965. These prior art light deflectors were limited to substantially two states, minimum and maximum, of diffracted light conditions as optical display systems. See the publication "Stripe Domains in Thin Magnetic Films and Their Application to Magneto-Optical Displays," Spain and Fuller, Journal of Applied Physics, Volume 37, No. 3, Mar. 1, 1966, pages 953 to 959.

In the E. J. Torok, et al, U.S. Pat. No. 3,752,563 there is disclosed a magneto-optic light deflection system that utilizes stripe domains in a magnetizable film as a diffraction grating. The angle of deflection of the light from the plane of the film is varied in two dimensions by varying the separation and orientation of the stripe domains. The wall separation is varied by varying the intensity of a DC field in the plane of the film parallel to the stripe domains, or by varying the intensity of the DC field normal to the plane of the film. The orientation of the stripe domains is varied by varying the direction of the DC field in the plane of the film. Hysteresis in the magnetizable film is overcome by an AC tickle field applied perpendicular to the stripe domains.

In the E. J. Torok U.S. Pat. No. 3,861,784 there is disclosed an apparatus that provides the processing of an optical image using the concept of the diffraction grating of the E. J. Torok, et al, U.S. Pat. No. 3,752,563. In this E. J. Torok patent there is disclosed an apparatus that is capable of varying the separation of adjacent domain walls and the rotatable orientation of the parallel stripe-domains. The resulting system is utilized to control, by the Kerr or Faraday effect, the focus of a light beam that is directed upon the plane of the magnetizable film. The apparatus includes a plurality of stripline arrays configured to permit the individual and selective control of a separation and the orientation of domain walls in each individual portion of the magnetizable film. This selective control of the domain wall separation and orientation in each individual portion of the magnetizable film permits an arbitrary configuration of domain walls of substantially continuously varying spacing and direction. Domain wall arrangements of different fixed configurations perform various imaging processing functions include a grating: to remove linear distortion: to remove U shaped distortions; to perform the function of a lens; to perform simultaneously the function of a lens and a translation of the image; to rotate the image; and, to simultaneously rotate and translate the image. The present invention is considered to be an improved apparatus for a method of rotating an optical image, using a magnetizable film formed diffraction grating.

SUMMARY OF THE INVENTION

The present invention is directed toward an apparatus for and a method of establishing the domain walls within a stripe-domain supporting magnetizable film in a radially directed orientation. The method includes: orienting an orienting field coil, having an iron core of substantially zero magnetic remanence, substantially orthogonal to, and above the center of, the planar surface of a stripe-domain supporting magnetizable film; and, orienting a tickle field coil having an air core, substantially parallel to, and below the center of the planar surface of the stripe-domain supporting magnetizable film. The tickle drive coil is initially energized by an AC drive current signal of significant to decreasing to 0 amplitude while, concurrently, the orienting field coil is energized by a pulsed drive current signal that extends beyond the termination of the AC drive current signal. The AC drive current signal is utilized to overcome the hysteresis of the magnetizable film while the DC drive current signal of a selected amplitude is utilized to achieve a corresponding domain-wall separation of the radially extending stripe-domains. The resulting diffraction grating is utilized to rotate an image borne by a normally incident laser beam.

BRIEF DESCRIPTION OF THE DRAWINGS

FIG. 1 is a diagramatic illustration of an optical data processing system into which the rotator of the present invention is incorporated.

FIG. 5 is a diagramatic illustration of the relationship of the orienting drive field and the stripe domain supporting magnetizable film of the present invention.

DESCRIPTION OF THE PREFERRED EMBODIMENT

Figure 2:
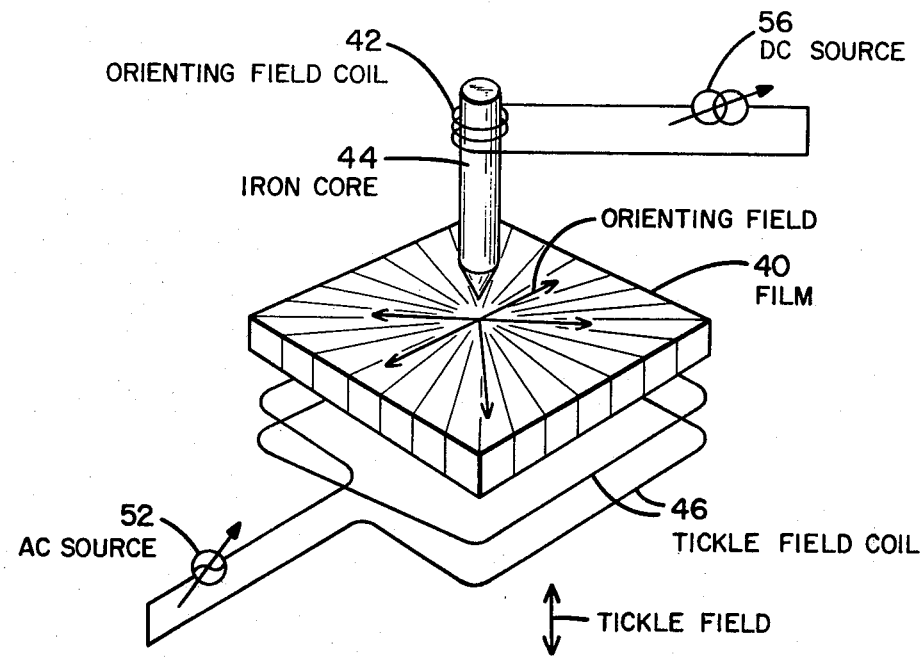
FIG. 2 is a diagramatic illustration of the apparatus of the present invention that generates a pattern of radially extending stripe domains within a stripe domain supporting magnetizable film.

In the field of optical processing it is necessary to correlate two signals, one known and another unknown. In one such optical system a "snapshot" of a real time unknown signal may be wished to be compared to a library of stored images that represent known signals. Such optical systems maximize the processing capability by utilizing parallel processing of the data. The known and unknown signals may be in the form of photographic transparencies or holograms in which a high speed photograph of the unknown signal is compared to a library of transparencies that represent the known signals. A detector formed of an array of photo diodes may be utilized to determine which transparency representing a known signal most closely matches the transparency representing the unknown signal.

Because the unknown signal representing transparency may be of a different orientation or magnitude relative to the known signal representing transparencies it is often necessary to rotate or magnify the unknown signal to bring it into proper alignment with the known signal.

With particular reference to FIG. 1 there is presented a diagramatic illustration of an optical system incorporating the rotator of the present invention. Laser source 10 generates a laser light beam 12 of 6328 Angstroms (Å). Light beam 12 is directed normally incident upon beam expander 14 emitting the expanded light beam 16. Light beam 16 is directed normally incident upon the surface of transparency 18, which may be representative of a stored image that represents an unknown signal. Transparency 18 modulates light beam 16 forming light beam 20 that now bears the unknown signal represented by transparency 18. Light beam 20 is then directed normally incident upon the rotator 22 which operates upon light beam 20 to provide a rotated light beam 24 which, in turn, is directed normally incident upon lens 26. Lens 26 is a Fourier transform lens—see the text "Contemporary Optics for Scientists and Engineers", Nussbaum and PHillips, Prentice-Hall, 1976, Chapter 10. The transformed light beam 28 is then directed normally incident upon transparency 30, which is positioned at the focal plane of lens 26. Transparency 30 contains the stored image that represents the known signal that is to be compared to the unknown signal stored in transparency 18.

Rotator 22 is energized by the proper control signals whereby the rotating light beam 24 is transformed by lens 26 to generate a rotating transformed light beam 28 that is swept across the surface of transparency 30 to generate a light beam 32 that is, in turn, directed normally incident upon the surface of detector 34. Detector 34 will detect the minimum or maximum light content of light beam 32 and the corresponding correlation of the unknown and known signals represented by transparency 18 and transparency 30, respectively.

Figure 3:
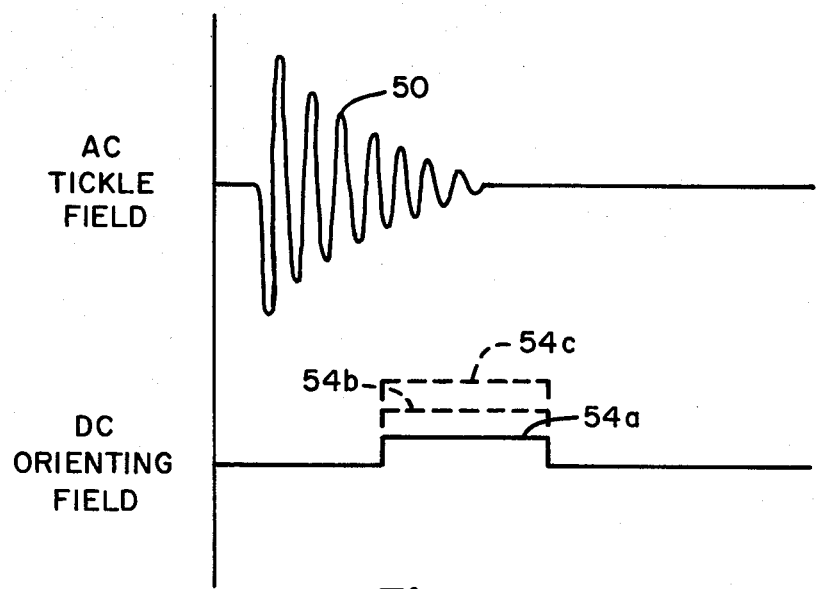
FIG. 3 is an illustration of the drive current signals used by the apparatus of FIG. 2.

With particular reference to FIG. 2 there is presented a diagramatic illustration of the apparatus of the present invention in which the stripe domain supporting magnetizable film 40 will have established therein a pattern of stripe domains whose inter-domain walls extend radially from the geometric center of the film 40. The apparatus of FIG. 2 is operated utilizing the drive current signals of FIG. 3 in the following manner:

An orienting field coil 42, having an iron needle as a core 44 of substantially zero magnetic remanence, is oriented substantially orthoganal to and above the planar surface of the stripe-domain supporting magnetizable film 40;

a tickle field coil 46, having an air core, is oriented substantially parallel to and below the center of the planar surface of the stripe-domain supporting magnetizable film 40;

tickle field coil 46 is energized by an AC drive current signal 50 from AC source 52 of significant to decreasing to zero amplitude while, concurrently, the orienting field coil 44 is energized by a pulsed drive current signal 54 from DC source 56, which pulsed drive current signal extends beyond the termination of the AC drive current signal—see FIG. 3.

The AC drive current signal 50 is utilized to overcome the hysteresis of the magnetizable film 40 while the DC drive current signal 44, of a selected amplitude 54a, 54b, 54c is utilized to achieve a corresponding domain-wall separation of the radially extending stripe-domains in magnetizable film 40. The resulting diffraction grating, when incorporated in an optical processing system, as in FIG. 1, is utilized to rotate an image borne by a normally incident light beam.

DISTORTIONLESS ROTATION

Figure 4:
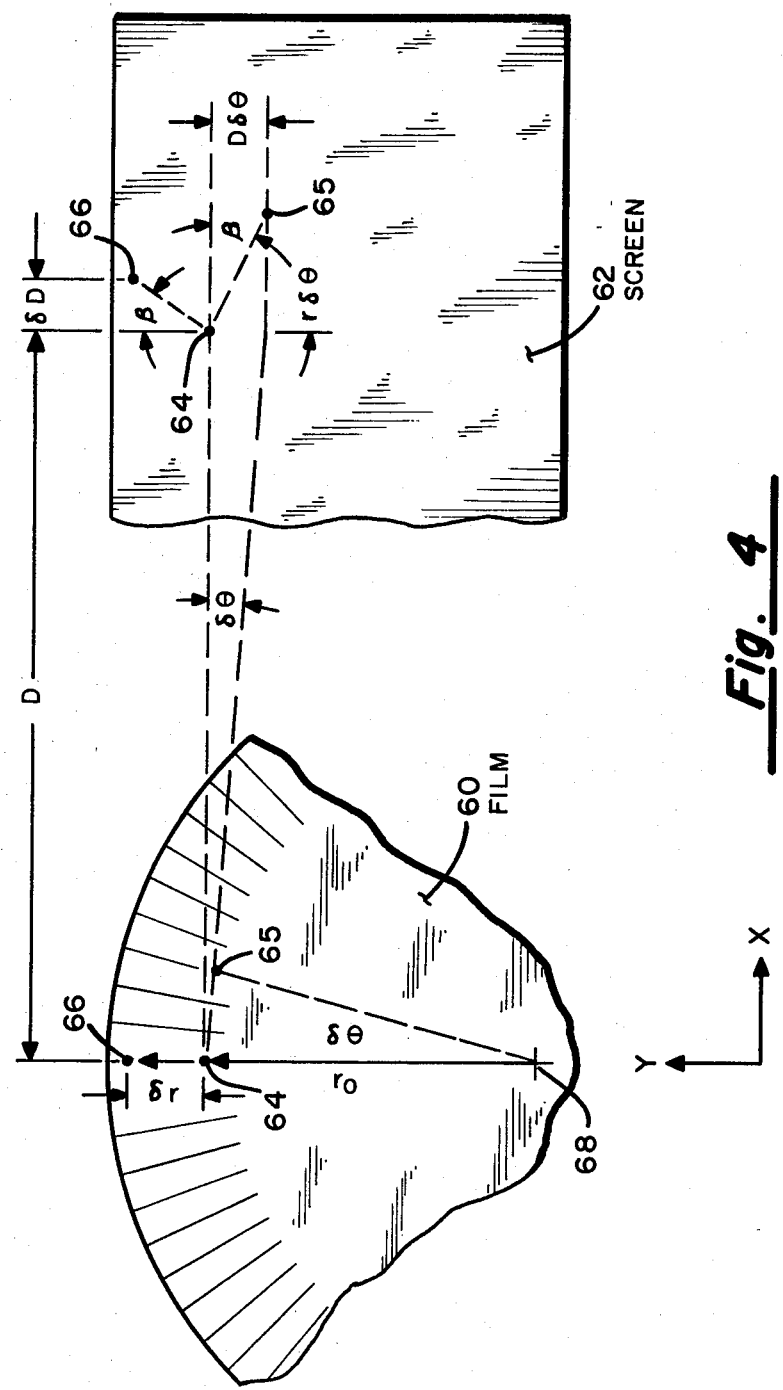
FIG. 4 is a diagramatic illustration of the manner in which the stripe domain supporting magnetizable film rotates the image borne by a normally incident light beam.

With particular reference to FIG. 4 there is presented a diagramatic illustration of a stripe-domain supporting magnetizable film 60 and a rotated image on the screen 62. The light beam (not shown) is directed along the Z axis normally incident to the plane of the paper of FIG. 4. The distance D is the distance that the light beam is deflected in the plane of the screen 62, perpendicular to the Z direction. Although screen 62 and film 60 are illustrated in FIG. 4 as being in the same plane (of the paper of FIG. 4) they are separated by a distance S along the Z axis. If W is the domain width, $\lambda$ the light wave length, then $$D = S\lambda/2W.$$

Consider a pattern of three dots 64, 65, 66 on the film 60. Let their position be described in polar coordinates: i.e., r is the distance from the center 68, or hub, of the stripe-domain pattern, and $\theta$ is the angular orientation of the inter-domain walls. Let the coordinates of the three dots 64, 65, 66 be $$(r_o, \theta_o), (r_o, \theta + \delta\theta) \text{ and } (r_o + \delta r, \theta_o),$$

respectively. A line connecting the first two dots 64 and 65 on film 60 will be rotated in angle $\beta$ on the image on screen 62. The angle $\beta$ is given by:

$$\tan = \frac{D\delta\theta}{r\delta o} = \frac{D}{r} = \frac{S\lambda}{2Wr}$$

A line connecting the first and third dots 64 and 66 will be rotated at an angle $\beta'$ given by:

$$\tan \beta' = \delta D/\delta r$$

in order to have no distortion in angles, it is required that $\beta = \beta'$. This condition will occur if:

$$D = kr$$

where k is an arbitrary constant. This means that domain width W must be inversely proportional to the radius:

$$W = c/r$$

where c is an arbitrary constant. Since $$D = S\lambda/2W$$

the angle of image rotation, $\beta$ is:

$$\beta = \tan^{-1} \frac{S\lambda}{2C}$$

the image will be magnified by a factor M:

$$M = 1/\cos \beta$$

STRIPE-DOMAIN GENERATION

It was shown hereinabove that the desired stripe-domain pattern in film 60 is a radial distribution of stripes with the stripe density proportional to the distance from the center 68. The stripe density is approximately proportional to the magnitude of the in-plane field, and the stripe orientation is parallel to the direction of the in-plane field. Therefore, an apparatus is required that will supply a radial in-plane field whose amplitude is proportional to the radius.

With particular reference to FIG. 5 there is presented a diagramatic illustration of a field 70 and an electromagnet pole-piece 72. The intensity of the Field 70 (H) from the pole 74 is inversely proportional to the square of the distance of pole 74 from film 78:

$$H = \frac{H_o}{x^2 + Z^2}$$

The component in the plane of the film, $H_x$, is given by $$H_x = H \sin \theta = \frac{H_o x}{(X^2 + Z^2)^{3/2}}$$

when expanded in a Taylor series this expression becomes $$H_x = \frac{H_o X}{Z^3} \left( 1 - \frac{3}{2} \left( \frac{X}{Z} \right)^2 + \frac{3.5}{2.4} \left( \frac{X}{Z} \right)^4 - \frac{3.5.7}{2.4.6} \left( \frac{X}{Z} \right)^6 + \ldots \right)$$

For small values of X/Z all but the first term can be neglected and then the in-plane field is both radial and proportional to the distance from the center of the film. The stripe-domain supporting magnetizable films that were used for the reduction to practice of this invention were bismuth substituted garnets without gallium substitution. Because the $4\pi M$ was so high, the normal component field (i.e., $H_y$) had relatively little effect on the stripe domain spacing for the magnitude of the fields that were applied. However, such effect can be cancelled with another pole piece 76 on the opposite side of the film as shown in FIG. 5.

What is claimed is:
1. In a diffraction grating formed from a stripe-domain supporting magnetizable film, the method of establishing the inter-domain walls in a radially directed orientation and their separation proportional to the distance from the center of the diffraction grating comprising:
   orienting an orienting field coil, having an iron core of substantially zero magnetic remanence, substantially orthoganal to, and above the planar surface of a stripe-domain supporting magnetizable film;
   orienting a tickle field coil, having an air core, substantially parallel to the planar surface of the stripe-domain supporting magnetizable films;
   energizing said tickle field coil by an AC drive current signal of significant to decreasing to zero amplitude; and,
   concurrently energizing said orienting field coil by a pulsed drive current signal that extends beyond the termination of the AC drive current signal, said energized tickle field coil and orienting field coil inducing in said stripe-domain supporting magnetizable film fields that conjointly establish the inter-domain walls in said film in a radially directed orientation, the separation of which is proportional to the distance from the center of the diffraction grating.
2. In a diffraction grating formed from a stripe-domain supporting magnetizable film, the method of establishing the inter-domain walls in a radially directed orientation from the center of the diffraction grating, comprising:
   orienting an orienting field coil, having an iron core of substantially zero magnetic remanence, with its axis substantially orthogonal to, and spaced above the center of a diffraction grating formed of a stripe-domain supporting magnetizable film; and,
   energizing said orienting field coil for inducing, in said stripe-domain supporting magnetizable film, fields that establish the inter-domain walls in said film in a radially directed orientation, the separation of which is proportional to the distance from the center of said diffraction grating.

* * * * *